(12) United States Patent
Nordbruch et al.

(10) Patent No.: US 10,551,831 B2
(45) Date of Patent: Feb. 4, 2020

(54) METHOD AND DEVICE FOR OPERATING A VEHICLE, AND METHOD FOR OPERATING A PARKING AREA

(71) Applicant: Robert Bosch GmbH, Stuttgart (DE)

(72) Inventors: Stefan Nordbruch, Kornwestheim (DE); Gerrit Quast, Nuertingen (DE); Matthew Nimmo, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 79 days.

(21) Appl. No.: 15/757,843

(22) PCT Filed: Jul. 15, 2016

(86) PCT No.: PCT/EP2016/066862
§ 371 (c)(1),
(2) Date: Mar. 6, 2018

(87) PCT Pub. No.: WO2017/041939
PCT Pub. Date: Mar. 16, 2017

(65) Prior Publication Data
US 2018/0341257 A1    Nov. 29, 2018

(30) Foreign Application Priority Data

Sep. 11, 2015 (DE) .......................... 10 2015 217 390

(51) Int. Cl.
*B60W 30/09* (2012.01)
*G05D 1/00* (2006.01)
(Continued)

(52) U.S. Cl.
CPC .............. *G05D 1/0011* (2013.01); *B60T 7/12* (2013.01); *B60T 7/16* (2013.01); *B60W 30/09* (2013.01);
(Continued)

(58) Field of Classification Search
CPC .............. G05D 1/0011; G05D 1/0276; G05D 2201/0213; B60T 7/12; B60T 7/16;
(Continued)

(56) References Cited

U.S. PATENT DOCUMENTS 10,336,268 B2 *  7/2019  Schroeder ............. B60T 8/1755
2014/0186146 A1   7/2014  Alan
(Continued)

FOREIGN PATENT DOCUMENTS

DE    102012202175 A1    8/2013
DE    102012203235 A1    9/2013
(Continued)

OTHER PUBLICATIONS

Sung et al., Autonomous vehicle guidance system with infrastructure, 2013, IEEE, p. 1-6 (Year: 2013).*
(Continued)

*Primary Examiner* — McDieunel Marc
(74) *Attorney, Agent, or Firm* — Norton Rose Fulbright US LLP; Gerard Messina (57) ABSTRACT

A method is described for operating a vehicle, the driverlessly driving vehicle halting in response to an emergency stop signal in the context of driverless driving of the vehicle within a parking facility, the method being free of a step of checking whether halting is necessary. A corresponding apparatus is described for operating a vehicle, and to a vehicle. A method is described for operating a parking facility for vehicles, and to a corresponding parking facility. A computer program is also described.

11 Claims, 3 Drawing Sheets

101 driverless driving halts in response to an emergency stop signal (51) Int. Cl.
    *B60T 7/16*    (2006.01)
    *G08G 1/16*    (2006.01)
    *B60T 7/12*    (2006.01)
    *G05D 1/02*    (2006.01)

(52) U.S. Cl.
    CPC ........... *G05D 1/0276* (2013.01); *G08G 1/164* (2013.01); *G05D 2201/0213* (2013.01)

(58) Field of Classification Search
    CPC ............. B60W 30/09; B60W 2550/10; B60W 2550/40; B60W 2550/0077; B60W 2270/402; B60W 30/162; G08G 1/164
    See application file for complete search history.

(56) References Cited

U.S. PATENT DOCUMENTS

| | | | | |
|---|---|---|---|---|
| 2017/0205824 | A1* | 7/2017 | Nordbruch | B60W 10/18 |
| 2018/0188726 | A1* | 7/2018 | Newman | G01C 21/3407 |
| 2018/0240343 | A1* | 8/2018 | Nordbruch | B60W 30/09 |
| 2018/0286249 | A1* | 10/2018 | Nordbruch | G05D 1/0214 |
| 2019/0039604 | A1* | 2/2019 | Auracher | G05D 1/0061 |
| 2019/0077272 | A1* | 3/2019 | Newman | H02J 7/0063 |
| 2019/0180618 | A1* | 6/2019 | Nordbruch | G08G 1/14 |

FOREIGN PATENT DOCUMENTS

| | | |
|---|---|---|
| DE | 102012222562 A1 | 6/2014 |
| DE | 102013221274 A1 | 4/2015 |
| EP | 2695797 A2 | 2/2014 |

OTHER PUBLICATIONS

Sung et al., System architecture for autonomous driving with infrasturcture sensors, 2012, IEEE, p. 1-6 (Year: 2012).*

Pollard et al., An ontology-based model to determine the automation level of an automated vehicle for co-driving, 2013, IEEE, p. 596-603 (Year: 2013).*

Inaba et al., Intelligent parking reservation service on the Internet, 2001, IEEE, 2001, 159-164 (Year: 2001).*

International Search Report dated Oct. 17, 2016, of the corresponding International Application PCT/EP2016/066862 filed Jul. 15, 2016.

\* cited by examiner

501 — transmit emergency stop signal to driverlessly driving vehicle

Fig. 6

601 — receive emergency stop request by way of parking facility management server from a subscriber 603 — generate emergency stop signal immediately in response to emergency stop request

METHOD AND DEVICE FOR OPERATING A VEHICLE, AND METHOD FOR OPERATING A PARKING AREA

FIELD

The present invention relates to a method and an apparatus for operating a vehicle. The present invention further relates to a vehicle. The present invention additionally relates to a method for operating a parking facility for vehicles. The present invention relates to a parking facility for vehicles. The present invention relates to a computer program.

BACKGROUND INFORMATION

German Patent Application No. DE 10 2012 222 562 A1 presents a system for managed parking areas for transferring a vehicle from a starting position to a destination position.

In fully automated (autonomous) "valet parking," a vehicle is parked by its driver at a dropoff location, for example in front of a parking garage, and the vehicle drives itself from there into a parking position/parking bay and back again to the dropoff location.

In the context of so-called fully automated valet parking, it is important that the autonomously driving vehicle not cause any accidents, for example that it not collide with an object that is present within the parking facility.

SUMMARY

An object of the present invention is to provide for efficiently reducing a risk of accident or collision affecting a vehicle driving driverlessly within a parking facility.

This object may be achieved in accordance with the present invention. Advantageous embodiments of the present invention are described herein.

According to one aspect of the present invention, a method for operating a vehicle is furnished, the driverlessly driving vehicle halting in response to an emergency stop signal in the context of driverless driving of the vehicle within a parking facility, the method being free of a step of checking whether halting is necessary.

According to a further aspect of the present invention, an apparatus for operating a vehicle is furnished, encompassing an emergency stop device that is embodied to halt the vehicle, in a context of driverless driving by the vehicle within a parking facility, immediately in response to an emergency stop signal.

In accordance with a further aspect of the present invention, a vehicle that is embodied for driverless driving within a parking facility is furnished, the vehicle encompassing the apparatus for operating a vehicle.

In accordance with a further aspect of the present invention, a method for operating a parking facility for vehicles is furnished, an emergency stop signal being transmitted to a driverlessly driving vehicle in the context of driverless driving by the vehicle within the parking facility, the method being free of a step of checking, before transmission, whether halting is necessary.

According to another aspect of the present invention, a parking facility for vehicles is furnished, the parking facility being embodied to carry out the method for operating a parking facility for vehicles.

According to a further aspect of the present invention, a computer program that encompasses program code for carrying out the method for operating a vehicle, and/or for carrying out a method for operating a parking facility for vehicles, when the computer program is executed on a computer, is furnished.

The present invention therefore encompasses, in particular and inter alia, the idea that the driverlessly driving vehicle halts immediately in response to the emergency stop signal, a check as to whether halting is in fact necessary not being first provided for or carried out. This therefore means that no check is carried out as to whether halting is necessary. Instead, driverless halting is carried out by way of the vehicle immediately in response to the emergency stop signal.

This brings about in particular the technical advantage that a risk of collision or accident is reduced for the driverlessly driving vehicle. The reason is that because a check is omitted, less time elapses before the vehicle halts in response to the emergency stop signal, as compared with the case in which a check is still carried out beforehand. The reason is that a check as a rule requires a certain amount of time before it arrives at a result. The driverlessly driving vehicle continues to drive during that time, however, so that a braking distance then might no longer be sufficient to prevent a collision with an object.

According to an embodiment, a vehicle is a motor vehicle. The motor vehicle is, for example, a passenger car or a commercial vehicle. The motor vehicle is, for example, a two-wheeled motor vehicle, for example a motorcycle.

The fact that the vehicle is "driving driverlessly" means or signifies that the vehicle is not being controlled or guided by a human driver or human vehicle operator. Driverless driving encompasses, for example, the fact that the vehicle is remotely controlled. This means, for example, that remote control commands are transmitted to the vehicle. Driverless driving encompasses, for example, the fact that the vehicle is driving autonomously, i.e., unassistedly. For example, mixed forms are provided, meaning that the vehicle is remotely controlled over one route segment and travels autonomously on another route segment.

Provision is made, for example, that a destination position within the parking facility is conveyed to the vehicle, the vehicle then driving autonomously, i.e., unassistedly, to that destination position. The vehicle navigates to the destination position, for example, based on a digital map of the parking facility. That digital map is conveyed to the vehicle, for example, via a communication network. In general, for example, information that is relevant for autonomous driving within the parking facility is conveyed to the vehicle via the communication network. The vehicle then drives autonomously within the parking facility, in particular to the destination position, based on that information. Such information encompasses, for example: positions of further vehicles, speed data for further vehicles, a target trajectory to be traveled by the vehicle.

The fact that the method is "free of" a step of checking whether halting is necessary therefore means in particular that no provision is made in the method for checking whether halting is necessary. No check as to whether halting is necessary therefore takes place. A check as to whether halting is necessary is therefore dispensed with. The check is therefore omitted.

In another embodiment, provision is made that the emergency stop signal is generated externally to the vehicle and is transmitted to the vehicle without a further check as to whether halting is necessary, the vehicle halting immediately in response to reception of the emergency stop signal.

This brings about in particular the technical advantage that no time is required for checking, so that a braking distance available to the vehicle is not correspondingly shortened as compared with the case in which a check still takes place beforehand.

"Transmission" of the emergency stop signal to the vehicle means, for example, that the emergency stop signal is transmitted via a communication network to the vehicle.

A "communication network" for purposes of the present invention encompasses in particular a WLAN communication network and/or a mobile radio network and/or a communication network in accordance with the low power wide-range communication (LoRa) standard. According to an embodiment, the communication network therefore encompasses a LoRa communication network.

In another embodiment, a communication via the communication network becomes and/or is encrypted.

The formulation "respectively" comprises in particular the formulation "and/or".

According to an embodiment, provision is made that the emergency stop signal is an emergency stop signal generated externally to the vehicle. According to an embodiment, the vehicle receives this emergency stop signal generated externally to the vehicle via the communication network, and halts immediately in response to reception of the emergency stop signal without checking again as to whether halting is necessary. This therefore means that, according to an embodiment, the vehicle itself also no longer carries out a check as to whether halting is necessary.

In accordance with another embodiment, provision is made that the vehicle receives the emergency stop signal via a communication network from a subscriber of the communication network.

This brings about in particular the technical advantage that subscribers of the communication network can efficiently stop the vehicle by way of the emergency stop signal. A subscriber of the communication network is, for example, a person who is present within the parking facility. The person has, for example, a terminal device, in particular a mobile terminal device, by way of which the person can communicate via the communication network. The person thus becomes a subscriber of the communication network by way of the terminal device.

A subscriber of the communication network is therefore in particular a terminal device, for example a mobile terminal device. A terminal device is, for example, in general a mobile telephone. The person is, for example, an operator or manager of the parking facility. That person sees, for example, that a problem exists for the vehicle as it is driving driverlessly, and activates an emergency stop. For example, the subscriber is the parking facility management server. The operator can thus, in particular, transmit the emergency stop signal to the vehicle by way of the parking facility management server via the communication network.

According to a further embodiment, provision is made that the emergency stop signal is generated by the vehicle itself based on a hazardous situation detected by the vehicle, the vehicle halting in the absence of any further check of the detected hazardous situation as to whether halting is necessary.

This brings about in particular the technical advantage that an available braking distance for the vehicle is not unnecessarily shortened as compared with the case in which a further check of the detected hazard situation were to take place. This brings about in particular the technical advantage that a reaction time for the vehicle following detection of a hazardous situation is efficiently reduced.

A "hazardous situation" encompasses, for example, an imminent collision with an object. Such an object is, for example, a further vehicle, an infrastructure of the parking facility, or a person. A "hazardous situation" therefore means in particular that an object is located in the surroundings of the vehicle, a collision with that object being imminent.

According to an embodiment, the vehicle detects the hazardous situation by way of its surrounding-area sensor suite. A surrounding-area sensor suite encompasses one or several surrounding-area sensors. A surrounding-area sensor is, for example, one of the following surrounding-area sensors: video sensor, laser sensor, ultrasonic sensor, lidar sensor, magnetic sensor, or radar sensor.

Detection of the hazardous situation therefore encompasses in particular surrounding-area sensing by way of the surrounding-area sensor suite of the vehicle. The sensed surrounding area is then analyzed, in particular, in terms of possible hazardous situations. Speed data and position data of the vehicle are taken into consideration in particular in this analysis.

In accordance with a further embodiment, provision is made that the vehicle halts immediately in response to a first emergency stop signal when several emergency stop signals are present, so that the method is free of a step such that the vehicle waits for a second emergency stop signal before halting.

This brings about in particular the technical advantage that a reaction time of the vehicle is efficiently reduced. The technical advantage thereby brought about is in particular that an available braking distance is not unnecessarily shortened as compared with the case in which the vehicle might additionally carry out a check or wait for a second emergency stop signal.

These several emergency stop signals encompass, for example, the emergency stop signal generated externally to the vehicle and the emergency stop signal generated internally to the vehicle, i.e., the emergency stop signal that was generated by the vehicle itself based on a hazardous situation detected by the vehicle. This therefore means that even in the case in which several emergency stop signals may be made available to the vehicle, it always halts immediately in response to the first emergency stop signal. The vehicle therefore does not wait to determine whether the first emergency stop signal is also followed by a second emergency stop signal in order to confirm that the vehicle should come to a stop.

A "hazardous situation" encompasses in particular a problem that occurs internally to the vehicle. This therefore means that the hazardous situation can encompass a problem internal to the vehicle. A problem internal to the vehicle encompasses, for example, a malfunction of a vehicle system, for example of a surrounding-area sensor suite. A malfunction of a vehicle system encompasses, for example, a malfunction of a communication system. A vehicle system encompasses, for example, a braking system, a steering system, and/or a drive system. This therefore means in particular that a detected hazardous situation encompasses the fact that a malfunction has occurred in one of the vehicle systems recited above. This therefore means that the vehicle halts immediately upon detection of such a malfunction. Detection of such a malfunction thus results in generation of an emergency stop signal, so that the vehicle halts immediately in response to the emergency stop signal.

According to an embodiment, the apparatus for operating a vehicle is embodied or configured to execute or carry out the method for operating a vehicle.

According to an embodiment, provision is made that the vehicle is embodied or configured to execute or carry out the method for operating a vehicle.

Technical functionalities of the apparatus for operating a vehicle are evident from corresponding technical functionalities of the method for operating a vehicle, and vice versa. Corresponding statements made in conjunction with the apparatus for operating a vehicle apply analogously to the method for operating a vehicle, and vice versa.

According to an example embodiment, provision is made that an emergency stop request is received by way of a parking facility management server of the parking facility, from a subscriber of a communication network, via the communication network, the emergency stop signal being transmitted immediately, in response to reception of the emergency stop request, to the driverlessly driving vehicle by way of the parking facility management server.

This brings about in particular the technical advantage that the subscriber of the communication network can stop the vehicle efficiently. In particular, an available braking distance is not unnecessarily shortened. The technical advantage brought about is in particular that a reaction time for the vehicle is efficiently reduced.

This therefore means that the subscriber makes a request of the parking facility management server (emergency stop request) for the vehicle to halt. The parking facility management server thereupon immediately transmits the emergency stop signal to the driverlessly driving vehicle. This therefore means that the parking facility management server refrains from any check as to whether or not the emergency stop request is permissible or necessary. The parking facility management server therefore in particular refrains from checking whether halting is necessary.

A "parking facility" for purposes of the present invention can be referred to as a "parking area," and serves as an area for parking vehicles. The parking facility thus constitutes a contiguous area that has several parking locations (for a parking facility on private property) or parking spaces (for a parking facility on public property). According to an embodiment, the parking facility is embodied as a parking structure. According to an embodiment, the parking facility is embodied as a parking garage.

A "destination position" for the vehicle is, for example, a parking position within the parking facility, i.e., a parking location or a parking space, at which the vehicle is to park. A destination position is, for example, a pickup position within the parking facility at which a user is intended to pick up his or her vehicle.

In general, "driverless driving" of the vehicle is encompassed by an automatic parking operation. An automatic parking operation of this kind encompasses the fact that the vehicle is guided driverlessly from a starting position, which can also be referred to as a "dropoff position," to a parking position (destination position) and parked there. The automatic parking operation further encompasses the fact that the vehicle is guided driverlessly from the parking position to a pickup position (further destination position) and parked there. A "dropoff position" refers to a position at which the vehicle is intended to be parked by a person for execution of an automatic parking operation.

The present invention will be explained in further detail below with reference to preferred exemplifying embodiments.

BRIEF DESCRIPTION OF EXAMPLE EMBODIMENTS

DETAILED DESCRIPTION OF EXAMPLE EMBODIMENT

Figure 1:
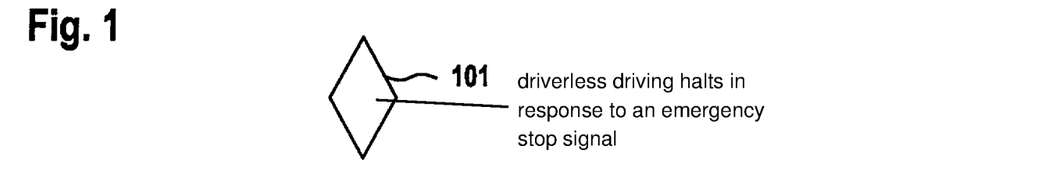
FIG. 1 is a flow chart of a method for operating a vehicle.

FIG. 1 is a flow chart of a method for operating a vehicle.
Provision is made in accordance with a step 101 that in the context of driverless driving of the vehicle within a parking facility, the driverlessly driving vehicle halts in response to an emergency stop signal. The method is free of a step of checking whether halting is necessary.

Figure 2:
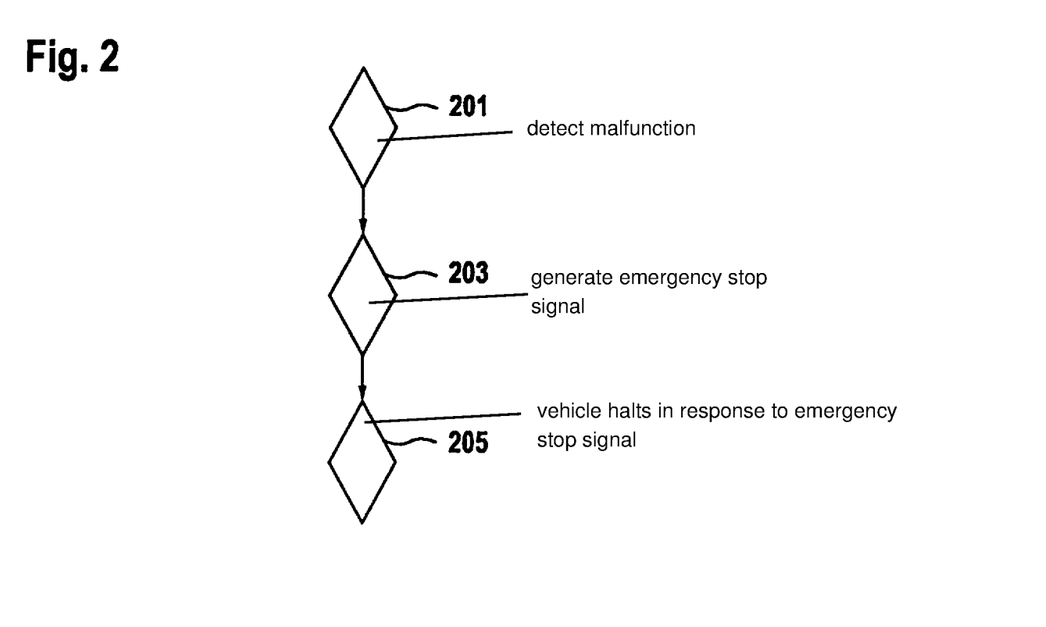
FIG. 2 is a flow chart of a further method for operating a vehicle.

FIG. 2 shows a flow chart of a further method for operating a vehicle.

In the context of driverless driving of the vehicle within a parking facility, the vehicle identifies a malfunction in a vehicle system. (Step 201) For example, the vehicle detects that a surrounding-area sensor suite has failed or is functioning in only limited fashion. For example, the vehicle detects that a communication system has failed. For example, the vehicle detects that a braking system is reporting a malfunction. On the basis thereof the vehicle generates, internally to the vehicle, an emergency stop signal in accordance with a step 203, and in response to the generated emergency stop signal halts in accordance with a step 205. Provision is made here that the vehicle refrains from once again checking the detected hazardous situation as to whether halting is necessary.

Figure 3:
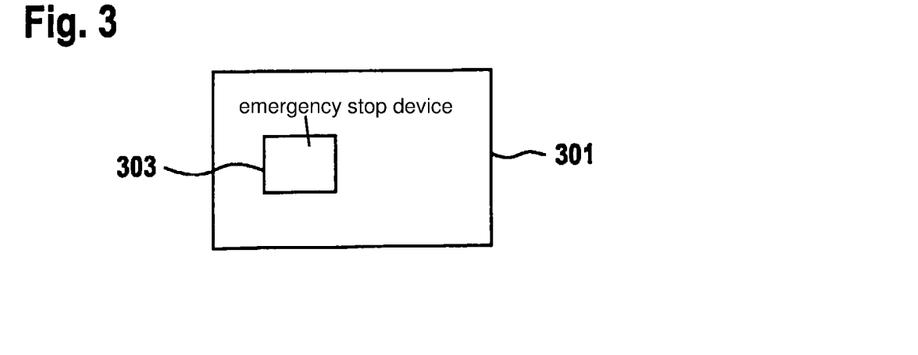
FIG. 3 shows an apparatus for operating a vehicle.

FIG. 3 shows an apparatus for operating a vehicle.
Apparatus 301 encompasses an emergency stop device 303 that is embodied to halt the vehicle, in the context of driverless driving of the vehicle within a parking facility, immediately in response to an emergency stop signal.

Figure 4:
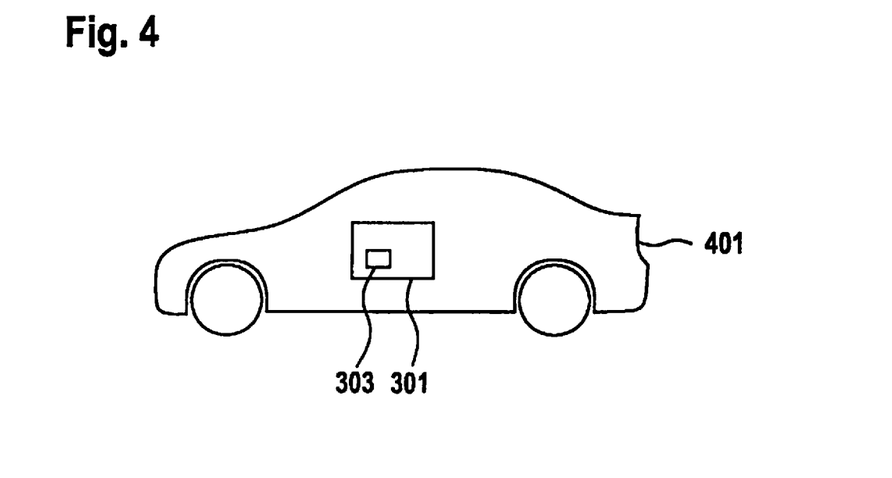
FIG. 4 shows a vehicle.

FIG. 4 shows a vehicle 401.
Vehicle 401 is embodied for driverless driving within a parking facility. Vehicle 401 encompasses apparatus 301 of FIG. 3.

Figure 5:
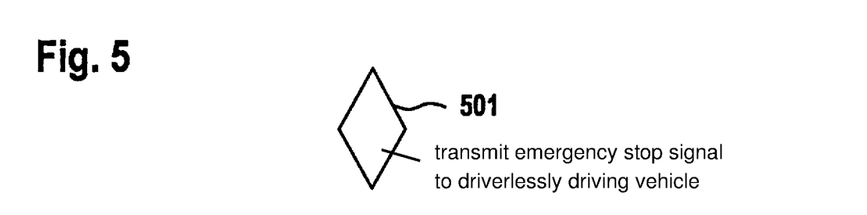
FIG. 5 is a flow chart of a method for operating a parking facility for vehicles.

FIG. 5 is a flow chart of a method for operating a parking facility for vehicles.

Provision is made in accordance with a step 501 that in the context of driverless driving of a vehicle within the parking facility, an emergency stop signal is transmitted to the driverlessly driving vehicle. The method is free of a step of checking, before transmitting, as to whether halting is necessary. This therefore means that a check is no longer made, before the emergency stop signal is transmitted to the driverlessly driving vehicle, as to whether halting is necessary.

Figure 6:
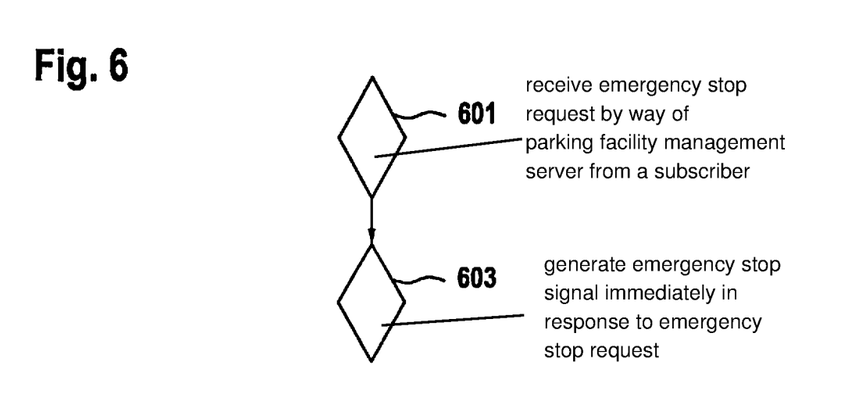
FIG. 6 is a flow chart of a further method for operating a parking facility for vehicles.

FIG. 6 is a flow chart of a further method for operating a parking facility for vehicles.

In a step 601, an emergency stop request is received by way of a parking facility management server of the parking facility, via a communication network, from a subscriber of the communication network. Provision is made in accordance with a step 603 that an emergency stop signal is generated immediately in response to reception of the emergency stop request, and transmitted to the driverlessly driving vehicle by way of the parking facility management server. This therefore means that the emergency stop request is no longer checked as to whether an emergency stop of the vehicle, i.e., halting, is necessary. Instead, the emergency stop signal is transmitted to the driverlessly driving vehicle, via the communication network, directly and immediately without prior examination.

Figure 7:
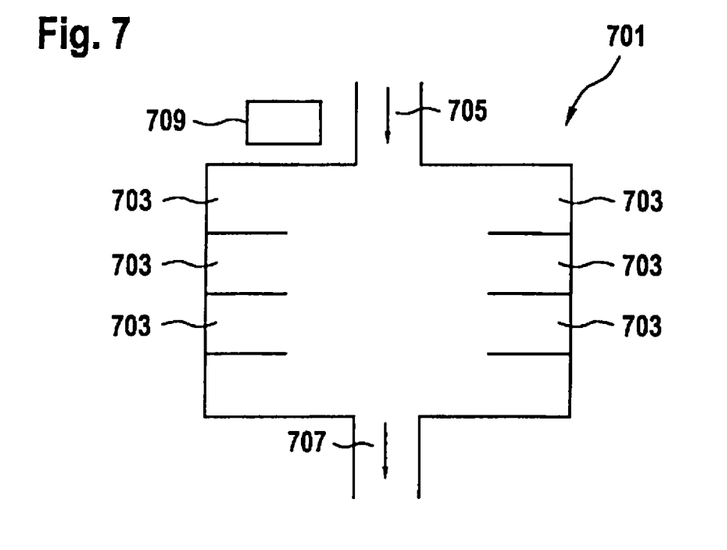
FIG. 7 shows a parking facility.

FIG. 7 shows a parking facility 701 for vehicles.

Parking facility 701 encompasses an entrance 705 and an exit 707 located oppositely from the entrance. In further exemplifying embodiments that are not shown, several entrances and/or several exists are provided.

Parking facility 701 encompasses several parking positions 703 in which vehicles can park.

Parking facility 701 encompasses a parking facility management server 709 that is embodied to carry out the method for operating a parking facility for vehicles.

For example, parking facility management server 709 receives an emergency stop request from a person (not shown) who is moving inside parking facility 701. For example, the person has detected a problem affecting a vehicle driving driverlessly within parking facility 701. The person requests in that context from the parking facility management server, by way of a mobile terminal device, for example by way of a mobile telephone, that the driverlessly driving vehicle halt. In that context the person transmits a corresponding emergency stop request by way of his or her mobile terminal to parking facility management server 709. Parking facility management server 709 generates and transmits an emergency stop signal to the driverlessly driving vehicle immediately in response to reception of the emergency stop request, so that vehicle halts in response to reception of the emergency stop signal.

Provision is made that no check is carried out as to whether halting is necessary.

Parking facility 701 is thus embodied to execute or carry out the method for operating a parking facility for vehicles.

Figure 8:
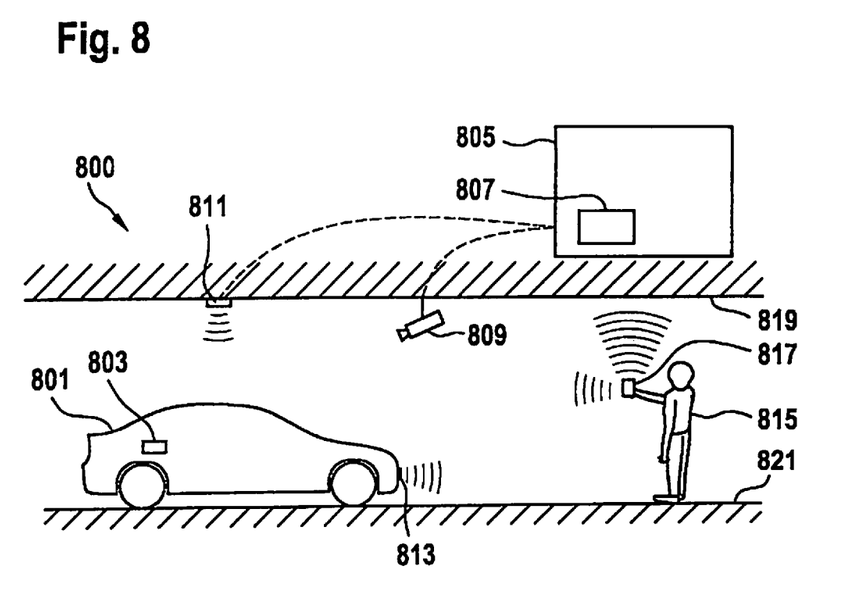
FIG. 8 schematically depicts a scenario in which the concept according to the present invention is utilized.

FIG. 8 shows a scenario in which the concept according to the present invention is utilized.

FIG. 8 is a simplified schematic depiction of a parking facility 800. A vehicle 801 is driving on a travel path 821 of parking facility 800.

Vehicle 801 encompasses, for example, a computer program 803 that encompasses, for example, steps for carrying out the method for operating a vehicle. Vehicle 801 furthermore encompasses a surrounding-area sensor suite 813 that encompasses, for example, a radar sensor. Vehicle 801 thus detects, by way of its surrounding-area sensor suite 813, a person 815 who is located in front of vehicle 801 in travel path 821.

As soon as vehicle 801 has detected person 815, it categorizes this situation as a hazardous situation and generates an emergency stop signal, and halts immediately in response to generation of the emergency stop signal in order to prevent a collision with person 815. Vehicle 801 does not, in this context, wait to determine whether a second emergency signal is transmitted to the vehicle in order to confirm the detected hazardous situation. Provision is also not made for vehicle 801 to re-check the detected hazardous situation. For example, vehicle 801 could re-analyze the surrounding-area sensor data constituted or ascertained by way of surrounding-area sensor suite 813. The present invention specifically does not provide for this, however.

Person 815 is carrying with him or her a mobile terminal device 817. Person 815 detects vehicle 801, which is a driverlessly driving vehicle. Person 815 recognizes that vehicle 810 is driving toward him or her. He or she therefore requests, from a parking facility management server 805 of parking facility 801, an emergency stop, i.e., halt. Person 815 transmits to parking facility management server 805, by way of terminal device 817, a corresponding emergency stop request for that purpose.

Alternatively or additionally, person 815 transmits an emergency stop signal by way of terminal device 817 directly to vehicle 801, i.e., without detouring via parking facility management server 805.

Parking facility management server 805 receives the emergency stop request, and thereupon immediately generates and transmits an emergency stop signal to vehicle 801. In order to transmit the emergency stop signal to vehicle 801, parking facility management server 805 uses a communication interface 811 that is, for example, a WLAN base station, communication interface 811 being mounted on a ceiling 819 of parking facility 801.

Also mounted on ceiling 819 of parking facility 801 is a camera 809 that senses vehicle 801. Camera 809, or another camera, has also sensed person 815, even though FIG. 8 depicts only the fact that camera 809 is directed toward vehicle 801. Parking facility management server 805 thus assumes that a collision between vehicle 801 and person 815 is possible.

Parking facility management server 805 correspondingly generates an emergency stop signal and transmits it via communication interface 811 to vehicle 801, so that vehicle 801 immediately comes to a stop in response to reception of the emergency stop signal.

For all the emergency stop signals and/or emergency stop requests that are used, provision is made specifically that in no case is a check made as to whether halting is necessary. For example, upon reception of an emergency stop request, parking facility management server 805 specifically does not check whether it also considers, or not, that it is useful for vehicle 801 to halt. For example, parking facility management server 805 could plausibilize, by way of its camera 809, the emergency stop request on the part of person 815. That plausibilization would take time, however, and would shorten a braking distance available to vehicle 801 in order not to collide with person 815. Provision is therefore made according to the present invention that a corresponding check as to whether halting is necessary is omitted. Such a check is thus dispensed with.

The basic idea of the present invention is thus to be regarded as that of furnishing an efficient technical concept that enables efficient halting, i.e., efficient execution of an emergency stop, of a vehicle driving driverlessly within a parking facility. The basic idea of the present invention is to be regarded in particular as the fact that in an unclear and/or dangerous situation (hazardous situation), an emergency stop, i.e., a halt, is activated immediately upon the first emergency stop signal (which can also be referred to as an "activation signal" to the extent it activates a halt of the vehicle). This therefore means that a check of further signals and/or data sources (for example, cameras in the parking facility) is no longer performed.

The advantage of the present invention is to be regarded in particular as that of ensuring a very quick emergency stop.

Situations or scenarios in which a halt is requested, and/or in which an emergency stop signal is transmitted to the vehicle, and/or in which the vehicle itself generates an emergency stop signal and halts in response thereto, are in particular one or several of the following situations or scenarios:

The vehicle recognizes an unclear and/or recognized problem situation. Such situations are, for example, the following situations:

A pedestrian suddenly crosses the travel path of the vehicle, for example the pedestrian emerges from between two vehicles.

A vehicle suddenly crosses the travel path of the vehicle, for example has driven out of a parking space and has not seen the driverlessly driving vehicle.

A communication problem has occurred.

The parking facility management system has an internal fault. According to an embodiment, that internal fault can be detected as follows: The parking facility management system carries out check routines and/or redundant calculation functions with which components of the parking facility management system, and/or the parking facility management system as a whole, check(s) itself. For example, the monitoring sensors (for example, cameras), i.e., for example the surrounding-area sensors, are checked for functionality, for example for a frozen image and/or whether any signal at all is coming from the camera (in general, from the surrounding-area sensor). If it is found in this manner that a surrounding-area sensor is not functioning correctly, this is recognized as an internal fault.

If the parking facility management system detects a fault, the occurrence of the fault is reported to the vehicle via the communication network, whereupon the vehicle halts without waiting to determine whether the parking facility management system is also in fact explicitly requesting that the vehicle halt. In other words, an internal fault in the parking facility management system is alone sufficient for the vehicle to halt upon recognition of the internal fault.

According to an embodiment, provision is made that the parking facility management system, following recognition of the internal fault, transmits an emergency stop signal to the vehicle via the communication network.

The vehicle has an internal fault. That internal fault can be recognized, for example, analogously to the recognition of an internal fault in the parking facility management system. Here as well, the internal fault in the vehicle immediately causes the vehicle to halt.

In addition, for example, problems at or of various locations and/or people and/or products can be recognized. Examples are the following:

In the vehicle, it is determined by way of sensor systems internal to the vehicle that a pedestrian is walking in the travel path. One such sensor system internal to the vehicle is, for example, a surrounding-area sensor suite of the vehicle.

An internal program, which therefore runs on a computer of the vehicle, detects problems, for example: no communication between the vehicle and the parking facility management server and/or no communication between the vehicle and a further vehicle, an internal functional fault (for example, an autonomous driving functionality is no longer, or no longer correctly, functioning), internal problems with components (vehicle systems; for example, the brakes report a fault).

The internal program can, for example, not unequivocally assess a situation, for example whether pedestrians are possibly present in the travel route.

The following situations can occur, for example, in the parking facility management system:

Firstly, situations similar or identical to those with the vehicles can occur, except that here the parking facility management system replaces the vehicle.

An operator of the parking facility sees a problem and wishes to activate an emergency stop for one or all vehicles.

The driver, who is still in the vicinity, sees a problem and wishes to activate an emergency stop for one or several or all vehicles. For example, person 815 according to FIG. 8 can be the driver who is still in the vicinity of his or her vehicle 801.

The driver can activate an emergency stop of this kind, for example, directly via his or her mobile telephone, by transmitting an emergency stop signal directly to his or her vehicle.

In particular, the driver can transmit a corresponding emergency stop request, via his or her mobile telephone, to the parking facility management system, which transmits an emergency stop signal to the vehicle in response thereto.

A passerby who is in the vicinity sees a problem and wishes to activate an emergency stop of one or several or all vehicles. Analogously to the driver, this occurs via a mobile telephone and by way of an emergency stop request that is transmitted to the parking facility management server.

For example, parking facility 800 encompasses an emergency switch that, upon actuation by a passerby or a user, transmits an emergency stop request to the parking facility management server so that the latter, in response to reception of the emergency stop request, then immediately transmits an emergency stop signal to the vehicle.

The features of the present invention can be transferred in general to several driverlessly driving vehicles that are driving within the parking facility, so that those vehicles also immediately halt in response to an emergency stop signal, a check as to whether halting is necessary being omitted.

What is claimed is:

1. A method for operating a vehicle, comprising:
    halting, without checking whether halting is necessary, a driverlessly driving vehicle in response to an emergency stop signal in the context of driverless driving of the vehicle within a parking facility;
    wherein there is no checking whether the halting is necessary,
    wherein the emergency stop signal is generated when there is an emergency stop request and/or a malfunction is identified in a vehicle system, including at least one of: a possible collision involving the vehicle as detected by the parking facility; a vehicle sensor system, a vehicle communication system, and/or a vehicle braking system,
    wherein at least one of the following is satisfied:
        the emergency stop signal is generated externally to the vehicle and is transmitted to the vehicle without a further check as to whether halting is necessary, the vehicle halting immediately in response to reception of the emergency stop signal,
        the vehicle receives the emergency stop signal via a communication network from a subscriber of the communication network, and/or
        the emergency stop signal is generated by the vehicle itself based on a hazardous situation detected by the vehicle, the vehicle halting in an absence of any further check of the detected hazardous situation as to whether halting is necessary.

2. The method as recited in claim 1, wherein the emergency stop signal is generated externally to the vehicle and is transmitted to the vehicle without the further check as to whether halting is necessary, the vehicle halting immediately in response to reception of the emergency stop signal.

3. The method as recited in claim 1, wherein the vehicle receives the emergency stop signal via the communication network from the subscriber of the communication network.

4. The method as recited in claim 1, wherein the emergency stop signal is generated by the vehicle itself based on a hazardous situation detected by the vehicle, the vehicle halting in the absence of any further check of the detected hazardous situation as to whether halting is necessary.

5. The method as recited in claim 1, wherein the vehicle halts immediately in response to a first emergency stop signal when several emergency stop signals are present, so that the vehicle does not wait for a second emergency stop signal before halting.

6. An apparatus for operating a vehicle, comprising:
an emergency stop device embodied to halt the vehicle, in a context of driverless driving by the vehicle within a parking facility, immediately in response to an emergency stop signal;
wherein there is no checking whether the halting is necessary,
wherein the emergency stop signal is generated when there is an emergency stop request and/or a malfunction is identified in a vehicle system, including at least one of: a possible collision involving the vehicle as detected by the parking facility; a vehicle sensor system, a vehicle communication system, and/or a vehicle braking system,
wherein at least one of the following is satisfied:
the emergency stop signal is generated externally to the vehicle and is transmitted to the vehicle without a further check as to whether halting is necessary, the vehicle halting immediately in response to reception of the emergency stop signal,
the vehicle receives the emergency stop signal via a communication network from a subscriber of the communication network, and/or
the emergency stop signal is generated by the vehicle itself based on a hazardous situation detected by the vehicle, the vehicle halting in an absence of any further check of the detected hazardous situation as to whether halting is necessary.

7. A vehicle for providing driverless driving within a parking facility, comprising:
an emergency stop device embodied to halt the vehicle, the vehicle including an apparatus for operating the vehicle, in a context of driverless driving by the vehicle within a parking facility, immediately in response to an emergency stop signal;
wherein there is no checking whether the halting is necessary,
wherein the emergency stop signal is generated when there is an emergency stop request and/or a malfunction is identified in a vehicle system, including at least one of: a possible collision involving the vehicle as detected by the parking facility; a vehicle sensor system, a vehicle communication system, and/or a vehicle braking system,
wherein at least one of the following is satisfied:
the emergency stop signal is generated externally to the vehicle and is transmitted to the vehicle without a further check as to whether halting is necessary, the vehicle halting immediately in response to reception of the emergency stop signal,
the vehicle receives the emergency stop signal via a communication network from a subscriber of the communication network, and/or
the emergency stop signal is generated by the vehicle itself based on a hazardous situation detected by the vehicle, the vehicle halting in an absence of any further check of the detected hazardous situation as to whether halting is necessary.

8. A method for operating a parking facility for vehicles, the method comprising:
transmitting an emergency stop signal to a driverless vehicle, which is being driven without a driver, in the context of driverless driving by the vehicle within the parking facility;
wherein there is no checking, before transmission, whether halting is necessary,
wherein the emergency stop signal is generated when there is an emergency stop request and/or a malfunction is identified in a vehicle system, including at least one of: a possible collision involving the vehicle as detected by the parking facility; a vehicle sensor system, a vehicle communication system, and/or a vehicle braking system,
wherein at least one of the following is satisfied:
the emergency stop signal is generated externally to the vehicle and is transmitted to the vehicle without a further check as to whether halting is necessary, the vehicle halting immediately in response to reception of the emergency stop signal,
the vehicle receives the emergency stop signal via a communication network from a subscriber of the communication network, and/or
the emergency stop signal is generated by the vehicle itself based on a hazardous situation detected by the vehicle, the vehicle halting in an absence of any further check of the detected hazardous situation as to whether halting is necessary.

9. The method as recited in claim 8, further comprising:
receiving, by a parking facility management server of the parking facility, an emergency stop request, from a subscriber of a communication network, via the communication network; and
transmitting the emergency stop signal immediately, in response to reception of the emergency stop request, to the driverless vehicle, which is being driven without a driver, by the parking facility management server;
wherein there is no checking whether the halting is necessary,
wherein the emergency stop signal is generated when there is an emergency stop request and/or a malfunction is identified in a vehicle system, including at least one of: a possible collision involving the vehicle as detected by the parking facility; a vehicle sensor system, a vehicle communication system, and/or a vehicle braking system,
wherein at least one of the following is satisfied:
the emergency stop signal is generated externally to the vehicle and is transmitted to the vehicle without a further check as to whether halting is necessary, the vehicle halting immediately in response to reception of the emergency stop signal,
the vehicle receives the emergency stop signal via a communication network from a subscriber of the communication network, and/or
the emergency stop signal is generated by the vehicle itself based on a hazardous situation detected by the vehicle, the vehicle halting in an absence of any further check of the detected hazardous situation as to whether halting is necessary.

10. A parking facility for vehicles, comprising:
a transmitting arrangement to transmit an emergency stop signal to a driverlessly driving vehicle in the context of driverless driving by the vehicle within the parking facility;
wherein there is no checking, before the transmitting, whether halting is necessary, wherein the emergency stop signal is generated when there is an emergency stop request and/or a malfunction is identified in a vehicle system, including at least one of: a possible collision involving the vehicle as detected by the parking facility; a vehicle sensor system, a vehicle communication system, and/or a vehicle braking system, wherein at least one of the following is satisfied:
- the emergency stop signal is generated externally to the vehicle and is transmitted to the vehicle without a further check as to whether halting is necessary, the vehicle halting immediately in response to reception of the emergency stop signal,
- the vehicle receives the emergency stop signal via a communication network from a subscriber of the communication network, and/or
- the emergency stop signal is generated by the vehicle itself based on a hazardous situation detected by the vehicle, the vehicle halting in an absence of any further check of the detected hazardous situation as to whether halting is necessary.

11. A non-transitory computer-readable storage medium storing a computer program, which is executable by a processor, comprising:
a program code arrangement including program code for operating a vehicle, by performing the following:
halting a driverless vehicle, which is being driven without a driver, in response to an emergency stop signal in the context of driverless driving of the vehicle within a parking facility;

wherein there is no checking whether halting is necessary, wherein the emergency stop signal is generated when there is an emergency stop request and/or a malfunction is identified in a vehicle system, including at least one of: a possible collision involving the vehicle as detected by the parking facility; a vehicle sensor system, a vehicle communication system, and/or a vehicle braking system, wherein at least one of the following is satisfied:
- the emergency stop signal is generated externally to the vehicle and is transmitted to the vehicle without a further check as to whether halting is necessary, the vehicle halting immediately in response to reception of the emergency stop signal,
- the vehicle receives the emergency stop signal via a communication network from a subscriber of the communication network, and/or
- the emergency stop signal is generated by the vehicle itself based on a hazardous situation detected by the vehicle, the vehicle halting in an absence of any further check of the detected hazardous situation as to whether halting is necessary.

\* \* \* \* \*